US009761219B2

(12) United States Patent
Xu et al.

(10) Patent No.: US 9,761,219 B2
(45) Date of Patent: Sep. 12, 2017

(54) SYSTEM AND METHOD FOR DISTRIBUTED TEXT-TO-SPEECH SYNTHESIS AND INTELLIGIBILITY

(75) Inventors: Jun Xu, Singapore (SG); Teck Chee Lee, Singapore (SG)

(73) Assignee: Creative Technology Ltd, Singapore (SG)

( * ) Notice: Subject to any disclaimer, the term of this patent is extended or adjusted under 35 U.S.C. 154(b) by 798 days.

(21) Appl. No.: 12/427,526

(22) Filed: Apr. 21, 2009

(65) Prior Publication Data

US 2010/0268539 A1 Oct. 21, 2010

(51) Int. Cl.

| | |
|---|---|
| ***G10L 13/00*** | (2006.01) |
| ***G10L 13/08*** | (2013.01) |
| ***G10L 13/04*** | (2013.01) |
| ***G10L 13/07*** | (2013.01) |
| *G10L 19/00* | (2013.01) |
| *G10L 15/00* | (2013.01) |
| *G06F 17/00* | (2006.01) |
| *G06K 9/00* | (2006.01) |
| *G09G 5/02* | (2006.01) |

(52) U.S. Cl.

CPC .............. *G10L 13/08* (2013.01); *G10L 13/04* (2013.01); *G10L 13/07* (2013.01)

(58) Field of Classification Search

USPC ....... 704/260, 267, 233, 251, 3, 9, 258, 257, 704/277, 263; 715/201; 382/114; 345/698; 600/300

See application file for complete search history.

(56) References Cited

U.S. PATENT DOCUMENTS

| | | | | |
|---|---|---|---|---|
| 5,983,176 | A * | 11/1999 | Hoffert et al. | 704/233 |
| 6,081,780 | A * | 6/2000 | Lumelsky | G10L 13/08 704/260 |
| 6,148,285 | A * | 11/2000 | Busardo | 704/260 |
| 6,510,413 | B1 * | 1/2003 | Walker | G10L 13/02 704/258 |
| 6,810,379 | B1 * | 10/2004 | Vermeulen et al. | 704/260 |
| 7,010,489 | B1 * | 3/2006 | Lewis et al. | 704/260 |
| 7,113,909 | B2 * | 9/2006 | Nukaga et al. | 704/258 |
| 7,236,922 | B2 * | 6/2007 | Honda et al. | 704/2 |
| 7,334,183 | B2 * | 2/2008 | Rusnak et al. | 715/201 |
| 7,502,739 | B2 * | 3/2009 | Saito | G10L 13/10 704/260 |

(Continued)

*Primary Examiner* — Neeraj Sharma

(74) *Attorney, Agent, or Firm* — Russell Swerdon; Desmund Gean

(57) ABSTRACT

A method and system for distributed text-to-speech synthesis and intelligibility, and more particularly to distributed text-to-speech synthesis on handheld portable computing devices that can be used for example to generate intelligible audio prompts that help a user interact with a user interface of the handheld portable computing device. The text-to-speech distributed system 70 receives a text string from the guest devices and comprises a text analyzer 72, a prosody analyzer 74, a database 14 that the text analyzer and prosody analyzer refer to, and a speech synthesizer 80. Elements of the speech synthesizer 80 are resident on the host device and the guest device and an audio index representation of the audio file associated with the text string is produced at the host device and transmitted to the guest device for producing the audio file at the guest device.

3 Claims, 6 Drawing Sheets

(56) References Cited

U.S. PATENT DOCUMENTS 7,539,619 B1* 5/2009 Seligman ............ G06F 17/2755 704/2
7,716,049 B2* 5/2010 Tian .............................. 704/251
7,921,013 B1* 4/2011 Ostermann et al. .......... 704/260
8,214,216 B2* 7/2012 Sato .............................. 704/258
2001/0021906 A1* 9/2001 Chihara .................. G10L 13/10 704/258
2001/0047260 A1* 11/2001 Walker et al. ................ 704/260
2002/0103646 A1* 8/2002 Kochanski et al. .......... 704/260
2002/0143543 A1* 10/2002 Sirivara .................. G10L 13/06 704/260
2003/0028380 A1* 2/2003 Freeland ................. G10L 13/00 704/260
2003/0061051 A1* 3/2003 Kondo .................... G10L 13/06 704/263
2003/0163314 A1* 8/2003 Junqua .................... G10L 13/08 704/260
2004/0193398 A1* 9/2004 Chu et al. ......................... 704/3
2004/0215462 A1* 10/2004 Sienel et al. .................. 704/260
2006/0004577 A1* 1/2006 Nukaga et al. ............... 704/267
2006/0013444 A1* 1/2006 Kurzweil et al. ............. 382/114
2006/0229877 A1* 10/2006 Tian et al. .................... 704/267
2007/0118355 A1* 5/2007 Kato et al. ......................... 704/9
2007/0260461 A1* 11/2007 Marple .................... G09B 5/04 704/260
2008/0010068 A1* 1/2008 Seita ............................. 704/257
2008/0195391 A1* 8/2008 Marple ................... G10L 13/10 704/260
2009/0006096 A1* 1/2009 Li .......................... G10L 13/08 704/260
2009/0048841 A1* 2/2009 Pollet et al. .................. 704/260
2009/0248399 A1* 10/2009 Au ......................... G06F 17/27 704/9
2009/0259473 A1* 10/2009 Chang .................. G11B 27/034 704/260
2009/0318773 A1* 12/2009 Jung .................. A61B 5/04009 600/300
2010/0004931 A1* 1/2010 Ma et al. ...................... 704/244
2010/0076768 A1* 3/2010 Kato ...................... G10L 13/06 704/266
2010/0131260 A1* 5/2010 Bangalore ............. G06F 17/279 704/3

* cited by examiner

------
From: Lee Kim Soon <kimsoon@activemedia.com.sg>
To: William Pan; Chong Louis
Subject: Course schedule
Date: Wednesday, August 25, 2004 7:23 PM Hi there, Attached is the scheduled courses for the 1st half year for your reference. We do conduct trainings on Data Communications and Networking, but scheduled at 2nd half of the year. Prices shown are before GST.

Thank you for your time, I hope you'll be attending anyone of our course soon.

Best Regards,

Kim Soon
------

FIG. 7

Male voice: This email is from,
Female voice: Lee Kim Soon

Male voice: this email was sent to
Female voice: William Pan; Chong Louis

Male voice: the email title is
Female voice: Course schedule

Male voice: this email was sent on
Female voice: Wednesday, August 25, 2004 7:23 PM Female voice: ...

FIG. 8

SYSTEM AND METHOD FOR DISTRIBUTED TEXT-TO-SPEECH SYNTHESIS AND INTELLIGIBILITY

FIELD OF THE INVENTION

This invention relates generally to a system and method for distributed text-to-speech synthesis and intelligibility, and more particularly to distributed text-to-speech synthesis on handheld portable computing devices that can be used for example to generate intelligible audio prompts that help a user interact with a user interface of the handheld portable computing device.

BACKGROUND

The design of handheld portable computing devices is driven by ergonomics for user convenience and comfort. A main feature of handheld portable device design is maximizing portability. This has resulted in minimizing form factors and limiting power for computer resources due to reduction of power source size. Compared with general purpose computing devices, for example personal computers, desktop computers, laptop computers and the like, handheld portable computing devices have relatively limited processing power (to prolong usage duration of power source) and storage capacity resources.

Limitations in processing power and storage and memory (RAM) capacity restrict the number of applications that may be available in the handheld portable computing environment. An application which may be suitable in the general purpose computing environment may be unsuitable in a portable computing device environment due to the application's processing resource, power resource or storage capacity demand. Such an application is high-quality text-to-speech processing. Text-to-speech synthesis applications have been implemented on handheld portable computers, however the text-to-speech output achievable is of relatively low quality when compared with the text-to-speech output achievable in computer environments with significantly more processing and capacity capabilities.

There are different approaches taken for text-to-speech synthesis. One approach is articulatory synthesis, where model movements of articulators and acoustics of the vocal tract are replicated. However this approach has high computational requirements and the output using articulatory synthesis is not natural-sounding fluent speech. Another approach is format synthesis, which starts with acoustics replication, and creates rules/filters to create each format. Format synthesis generates highly intelligible, but not completely natural sounding speech, although it does have a low memory footprint with moderate computational requirements. Another approach is with concatenative synthesis where stored speech is used to assemble new utterances. Concatenative synthesis uses actual snippets of recorded speech cut from recordings and stored in a voice database inventory, either as waveforms (uncoded), or encoded by a suitable speech coding method. The inventory can contain thousands of examples of a specific diphone/phone, and concatenates them to produce synthetic speech. Since concatenative systems use snippets of recorded speech, concatenative systems have the highest potential for sounding natural.

One aspect of concatenative systems relates to use of unit selection synthesis. Unit selection synthesis uses large databases of recorded speech. During database creation, each recorded utterance is segmented into some or all of the following: individual phones, diphones, half-phones, syllables, morphemes, words, phrases, and sentences. Typically, the division into segments is done using a specially modified speech recognizer set to a "forced alignment" mode with some manual correction afterward, using visual representations such as the waveform and spectrogram. An index of the units in the speech database is then created based on the segmentation and acoustic parameters like the fundamental frequency (pitch), duration, position in the syllable, and neighboring phones. At runtime, the desired target utterance is created by determining the best chain of candidate units from the database (unit selection).

Attempts have been made to increase the quality standard of text-to-speech output in handheld portable devices. In a media management system discussed in United States Patent Application Publication No. 2006/0095848, a host personal computer has a text-to-speech conversion engine that performs a synchronization operation during connection with a media player device that identifies and copies to the personal computer any text strings that do not have an associated audio file on the media player device and converts at the personal computer the text string to a corresponding audio file for sending the audio file to the media player. Although the text-to-speech conversion is completely performed on the personal computer having significantly more processing and capacity capabilities than the media player device which allows for higher quality text-to-speech output from the media player, as the complete audio file is sent from the power computer to the media player device the data size of the audio file transferred from the host personal computer to the media player is relatively large and may take a large amount of time to transfer and occupy a large proportion of the storage capacity. Additionally, for each new text string on the media player, the media player must connect to the personal computer for conversion of the text string to the audio file (regardless whether the exact text string has been converted previously).

Thus, there is need for a text-to-speech synthesis system that enables high quality text-to-speech natural sounding output from a handheld portable device, while minimizing the size of the data transferred to and from the handheld portable device. There is a need to limit the dependency of the handheld portable device on a separate text-to-speech conversion device while maintaining high quality text-to-speech output from the handheld portable device. There is also a need to enable high intelligibility of the text-to-speech output from the handheld portable device.

SUMMARY

An aspect of the invention is a method for creating an audio index representation of an audio file from text input in a form of a text string and producing the audio file from the audio index representation, the method comprising receiving the text string; converting the text string to an audio index representation of an audio file associated with the text string at a text-to-speech synthesizer, the converting including selecting at least one audio unit from an audio unit inventory having a plurality of audio units, the selected at least one audio unit forming the audio file; representing the selected at least one audio unit with the audio index representation; and reproducing the audio file by concatenating the audio units identified in the audio index representation from the audio unit inventory or another audio unit synthesis inventory having the audio units identified in the audio index representation.

In an embodiment the receiving of the text string may be from either a guest device or any other source. The converting of the text string to an audio index representation of the audio file may be associated with the text string on a host device. The reproducing of the audio file by concatenating the audio units may be on the guest device. The converting of the text string to audio index representation of an audio file associated with the text string may further comprise analyzing the text string with a text analyzer. The converting of the text string to audio index representation of an audio file associated with the text string may further comprise analyzing the text string with a prosody analyzer. The selecting of at least one audio unit from an audio unit inventory having a plurality of audio units may comprise matching audio units from speech corpus and text corpus of the unit synthesis inventory. The audio file generates intelligible and natural-sounding speech, and the intelligible and natural-sounding speech may be generated using reproduction of competing voices.

An aspect of the invention is a method for distributed text-to-speech synthesis comprising receiving text input in a form of a text string at a host device from either a guest device or any other source; creating an audio index representation of an audio file from the text string on the host device and producing the audio file on the guest device from the audio index representation, the creating of the audio index representation including converting the text string to an audio index representation of an audio file associated with the text string at a text-to-speech synthesizer, the converting including selecting at least one audio unit from an audio unit inventory having a plurality of audio units, the selected at least one audio unit forming the audio file; representing the selected at least one audio unit with the audio index representation; and producing the audio file from the audio index representation including reproducing the audio file by concatenating the audio units identified in the audio index representation from either the audio unit inventory or another audio unit synthesis inventory having the audio units identified in the audio index representation.

An aspect of the invention is a system for distributed text-to-speech synthesis comprising a host device and a guest device in communication with each other, the host device adapted to receive a text input in a form of text string from either the guest device or any other source; the host device having a unit-selection module for creating an audio index representation of an audio file from the text string on the host device converting the text string to an audio index representation of an audio file associated with the text string at a text-to-speech synthesizer, the unit-selection module is arranged to select at least one audio unit from an audio unit inventory having a plurality of audio units, the selected at least one audio unit forming the audio file, the selected at least one audio unit is represented by the audio index representation; and the guest device comprising a unit-concatenative module and an inventory of synthesis units, the unit-concatenative module for producing the audio file from the audio index representation by concatenating the audio units identified in the audio index representation from the audio unit inventory or another audio unit synthesis inventory having the audio units identified in the audio index representation.

An aspect of the invention is a portable handheld device for creating an audio index representation of an audio file from text input in a form of a text string and producing the audio file from the audio index representation, the method comprising sending the text string to a host system for converting the text string to an audio index representation of an audio file associated with the text string at a text-to-speech synthesizer, the converting including the host system selecting at least one audio unit from an audio unit inventory having a plurality of audio units, the selected at least one audio unit forming the audio file, and representing the selected at least one audio unit with the audio index representation; and the portable handheld device comprising a unit-concatenative module and an inventory of synthesis units, the unit-concatenative module for reproducing the audio file by concatenating the audio units identified in the audio index representation from the audio unit inventory or another audio unit synthesis inventory having the audio units identified in the audio index representation.

An aspect of the invention is a host system for creating an audio index representation of an audio file from a text input in a form of text string and producing the audio file from the audio index representation, the method comprising a text-to-speech synthesizer for receiving a text string and converting the text string to an audio index representation of an audio file associated with the text string at a text-to-speech synthesizer, the text-to-speech synthesizer comprises a unit-selection unit and an audio unit inventory having a plurality of audio units, the unit-selection unit for selecting at least one audio unit from the audio unit inventory, the selected at least one audio unit forming the audio file, and representing the selected at least one audio unit with the audio index representation, for reproduction of the audio file by concatenating the audio units identified in the audio index representation from the audio unit inventory or another audio unit synthesis inventory having the audio units identified in the audio index representation.

BRIEF DESCRIPTION OF THE DRAWINGS

In order that embodiments of the invention may be fully and more clearly understood by way of non-limitative examples, the following description is taken in conjunction with the accompanying drawings in which like reference numerals designate similar or corresponding elements, regions and portions, and in which:

FIG. 7 is a sample block of text for illustration of speech output of the invention; and FIG. 8 is an example representation of speech output of the invention.

DETAILED DESCRIPTION

Figure 1:
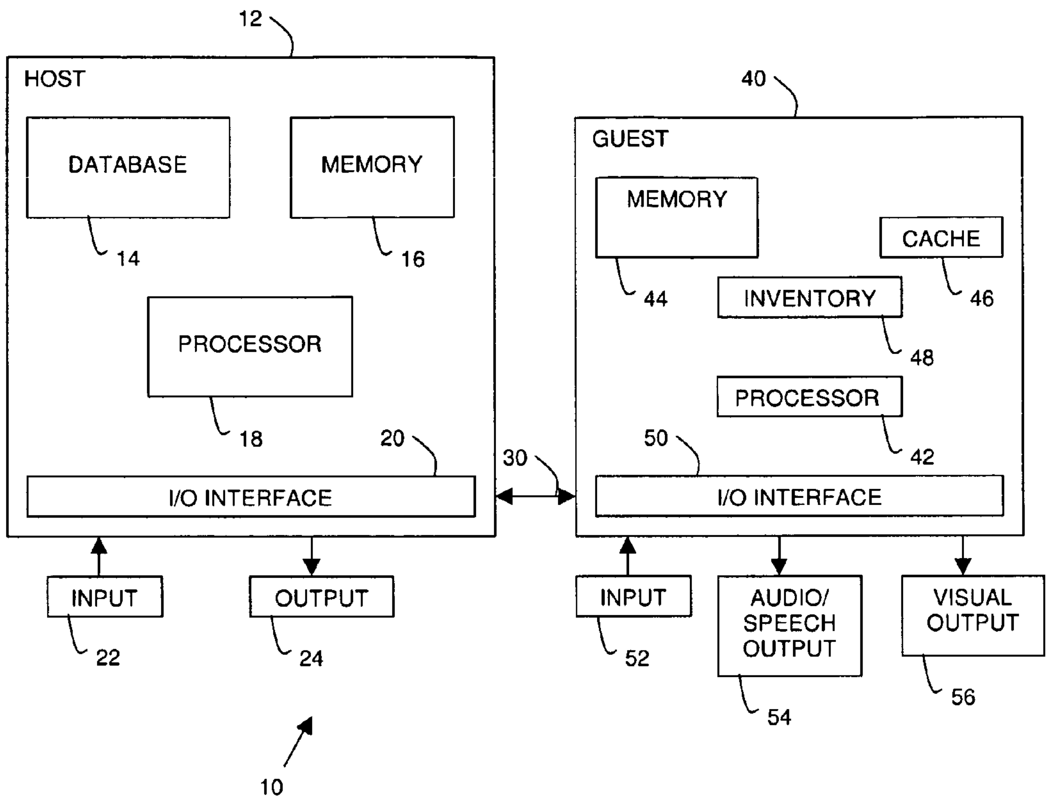
FIG. 1 is a system block diagram of a system which the invention may be implemented in accordance with an embodiment of the invention.

FIG. 1 is a system block diagram of a distributed text-to-speech system 10 which the invention may be implemented in accordance with an embodiment of the invention. The system 10 comprises guest device 40 that may interconnect with a host device 12. The guest device 40 typically has relatively less processing and storage capacity capabilities than the host device 12. The guest device 40 has a processor 42 that provides processing power with communication with memory 44, inventory 48, and cache 46 providing storage capacity within the guest device. The host device 12 has a processor 18 that provides processing power with communication with memory 16 and database 14 providing storage capacity within the host device 12. It will be appreciated that the database 14 may be remotely located to the guest 40 and/or host 12 devices. The host device 12 has interface 20 for interfacing with external devices such as guest device 40 and has input device 22 such as keyboard, microphone, etc., and output device 24 such as display, speaker, etc. The guest device has an interface 50 for interfacing with input devices 52 such as keyboard, microphone, etc., output devices 54, 56 such as audio/speech output like speaker, etc., visual output like display, etc. and to interface with host device 12 via interconnection 30. The interfaces 20, 50 of the devices may be arranged with ports such as universal serial bus (USB), firewire, and the like with the interconnection 30, where the interconnection 30 may arranged as wire or wireless communication.

The host device 12 may be a computer device such as a personal computer, laptop, etc. The guest device 40 may be a portable handheld device such as a media player device, personal digital assistant, mobile phone, and the like, and may be arranged in a client arrangement with the host device 12 as server.

Figure 2:
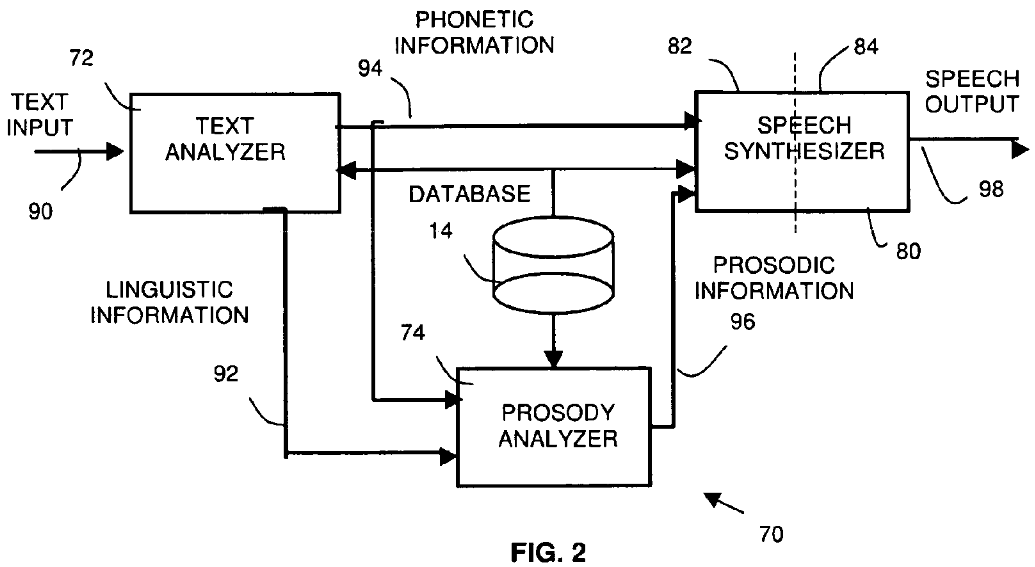
FIG. 2 is a block diagram to illustrate the text-to-speech distributed system in accordance with an embodiment of the invention.

FIG. 2 is a block diagram to illustrate the text-to-speech distributed system 70 in accordance with an embodiment of the invention that may be implemented in the system 10 shown in FIG. 1. For example, the text-to-speech distributed system has elements located on the host device 12 and the guest device 40. The text-to-speech distributed system 70 shown comprises a text analyzer 72, a prosody analyzer 74, a database 14 that the text analyzer 72 and prosody analyzer 74 refer to, and a speech synthesizer 80. The database 14 stores reference text for use by both the text analyzer 72 and the prosody analyzer 74. In this embodiment, elements of the speech synthesizer 80 are resident on the host device 12 and the guest device 40. In operation, text input 90 is a text string received at the text analyzer 72. The text analyzer 72 includes a series of modules with separate and intertwined functions. The text analyzer 72 analyzes input text and converts it to a series of phonetic symbols. The text analyzer 72 may include at least one task such as, for example, document semantic analysis, text normalization, and linguistic analysis. The text analyzer 72 is configured to perform the at least one task for both intelligibility and naturalness of the generated speech.

The text analyzer 72 analyzes the text input 90 and produces phonetic information 94 and linguistic information 92 based on the text input 90 and associated information on the database 14. The phonetic information 94 may be obtained from either a text-to-phoneme process or a rule-based process. The text-to-phoneme process is the dictionary-based approach, where a dictionary containing all the words of a language and their correct pronunciations are stored as the phonetic information 94. The rule-based process relates to where pronunciation rules are applied to words to determine their pronunciations based on their spellings. The linguistic information 92 may include parameters such as, for example, position in sentence, word sensibility, phrase usage, pronunciation emphasis, accent, and so forth.

Associations with information on the database 14 are formed by both the text analyzer 72 and the prosody analyzer 74. The associations formed by the text analyzer 72 enable the phonetic information 94 to be produced. The text analyzer 72 is connected with database 14, the speech synthesizer 80 and the prosody analyzer 74 and the phonetic information 94 is sent from the text analyzer 72 to the speech synthesizer 80 and prosody analyzer 74. The linguistic information 92 is sent from the text analyzer 72 to the prosody analyzer 74. The prosody analyzer 74 assesses the linguistic information 92, phonetic information 94 and information from the database 14 to provide prosodic information 96. The phonetic information 94 received by the prosody analyzer 74 enables prosodic information 96 to be generated where the requisite association is not formed by the prosody analyzer 74 using the database 14. The prosody analyzer 74 is connected with the speech synthesizer 80 and sends the prosodic information 96 to the speech synthesizer 80. The prosody analyzer 74 analyzes a series of phonetic symbols and converts it to prosody (fundamental frequency, duration, and amplitude) targets. The speech synthesizer 80 receives the prosodic information 96 and the phonetic information 94, and is also connected with the database 14. Based on the prosodic information 96, phonetic information 94 and the information retrieved from the database 14, the speech synthesizer 80 converts the text input 90 and produces a speech output 98 such as synthetic speech. Within the speech synthesizer 80, in an embodiment of the invention, a host component 82 of the speech synthesizer is resident or located on the host device 12, and a guest component 84 of the speech synthesizer is resident or located on the guest device 40.

Figure 3:
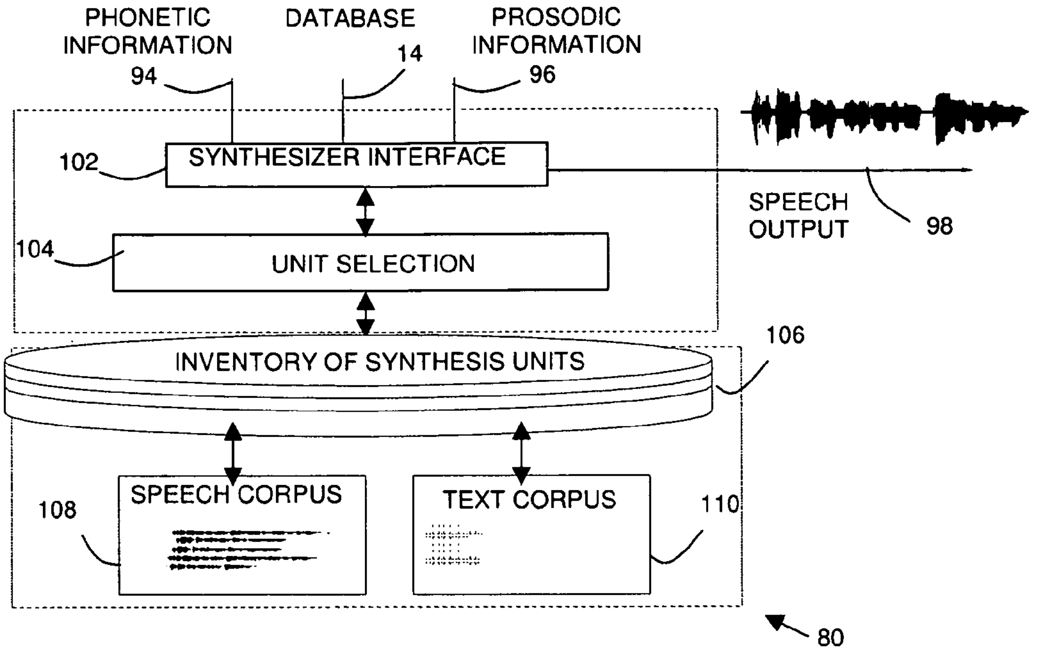
FIG. 3 is a block diagram to illustrate the speech synthesizer in accordance with an embodiment of the invention.

FIG. 3 is a block diagram to illustrate the speech synthesizer 80 in accordance with an embodiment of the invention that shows the speech synthesizer 80 in more detail than shown in FIG. 2. As described above, the speech synthesizer 80 receives the phonetic information 94, prosodic information 96, and information retrieved from database 14. The aforementioned information is received at a synthesizer interface 102, and after processing in the speech synthesizer 80, the speech output 98 is sent from the synthesizer interface 102. A unit selection module 104 accesses an inventory of synthesis units 106 which includes speech corpus 108 and text corpus 110 to obtain a synthesis units index or audio index which is a representation of an audio file associated with the text input 90. The unit-selection module 104 picks the optimal synthesis units (on the fly) from the inventory 106 that can contain thousands of examples of a specific diphone/phone.

Once the inventory of synthesis units 106 is complete, the actual audio file can be reproduced with reference to an inventory of synthesis units 106. The actual audio file is reproduced by locating a sequence of units in the inventory of synthesis units 106 which match the text input 90. The sequence of units may be located using Viterbi Searching, a form of dynamic programming. In an embodiment, an inventory of synthesis units 106 is located on the guest device 40 so that the audio file associated with the text input 90 is reproduced on the guest device 40 based on the audio index (depicted in FIG. 4 as 112) that is received from the host 12. It should be appreciated that the host 12 may also have the inventory of synthesis units 106. Further discussion will be presented with more detail with reference to FIG. 4.

Figure 4:
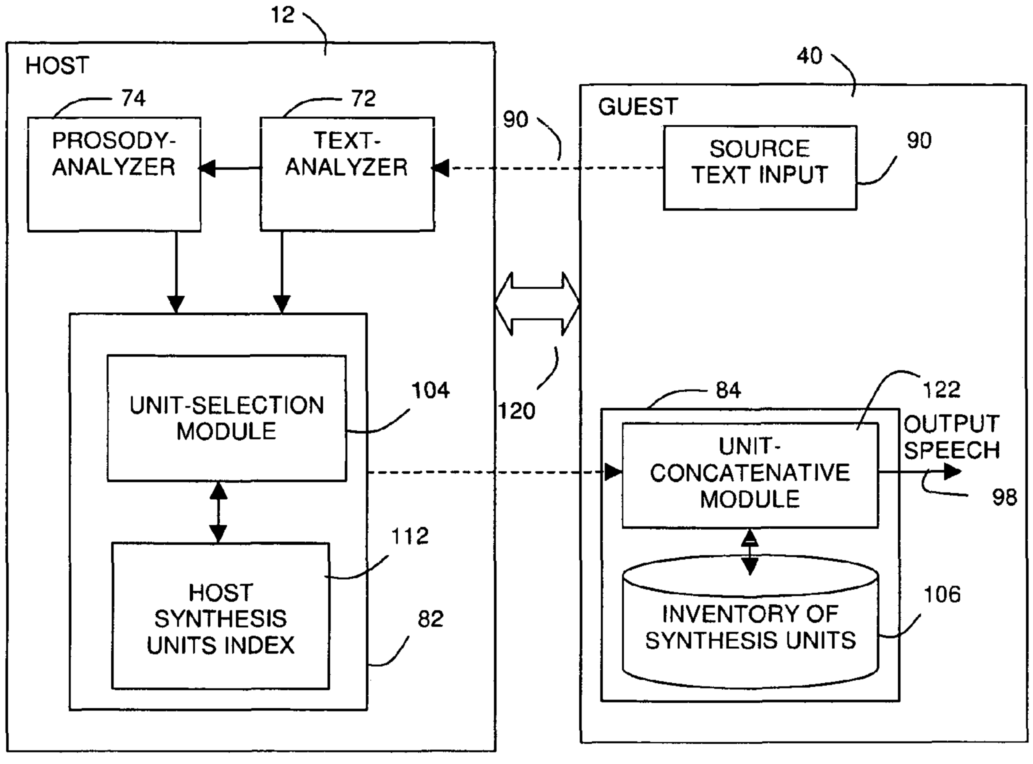
FIG. 4 is a block diagram of the speech synthesizer components on the host and guest in detail in accordance with an embodiment of the invention.

FIG. 4 is a block diagram of the speech synthesizer 80 components on the host 12 and guest 40 in detail in accordance with an embodiment of the invention. The host device 12 in this embodiment comprises the prosody analyzer 74, the text analyzer 72, and the host component 82 of the speech synthesizer 80. The prosody analyzer 74, the text analyzer 72, and the host component 82 of the speech synthesizer 80 are connected to the database 14 as discussed in a preceding paragraph with reference to FIG. 2, even though this is not depicted in FIG. 4. The host component 82 of the speech synthesizer 80 comprises a unit-selection module 104 and a host synthesis units index 112. In this embodiment the host synthesis units index module 112 may be configured to be an optimal synthesis units index 112. The optimal synthesis units index 120 is known as such as it is used to provide an optimal audio output from the speech synthesizer 80. Once the optimal synthesis units index 120 is produced by the unit selection module 104, the optimal synthesis units index 120 or audio index is sent to the guest device 40 for reproducing the audio file on the guest device 40 from the synthesis units index 120 or audio index that is associated with the text input 90. Once the audio file is generated from the optimal synthesis units index 120 or audio index, the guest device 40 may audibly reproduce the audio file to an output device 54 such as, for example, speakers, headphones, earphones, and the like. The guest component 84 of the speech synthesizer 80 comprises a unit concatentive module 122 that receives the optimal synthesis units index 120 or audio index from the host component 82 of the speech synthesizer 80. A unit-concatentive module 122 is connected to an inventory of synthesis units 106. The unit-concatenative module 122 concatenates the selected optimal synthesis units retrieved from the inventory 126 to produce speech output 98.

FIG. 7 is a sample block of text in a form of an email message which may be converted to speech using the system 10. In a first example for speech output 98, the sample block of text is reproduced as single voice speech in a conventional manner, where the sample block of text is orally reproduced in a manner starting from a top left corner of the text to a bottom right corner of the text. In a second example for speech output 98 as shown in FIG. 8, the same sample block of text as shown in FIG. 7 is reproduced as dual voice (a male voice and a female voice is shown for illustrative purposes) speech, where the dual voice speech may also be known as competing voice speech. It is appreciated that when the speech output 98 is reproduced in the competing voice speech form as shown in FIG. 8, intelligibility of the speech output 98 is enhanced. The speech output 98 may be either selectable between the single voice form and competing voice form or may be in a competing voice form only. While the competing voice speech form may be employed for email messages as per the aforementioned example in FIG. 7, it may also be usable for other forms of text. However, the other forms of text will need to be broken up in an appropriate manner for the competing voice form to be effective in enhancing intelligibility of the speech output 98.

Figure 5:
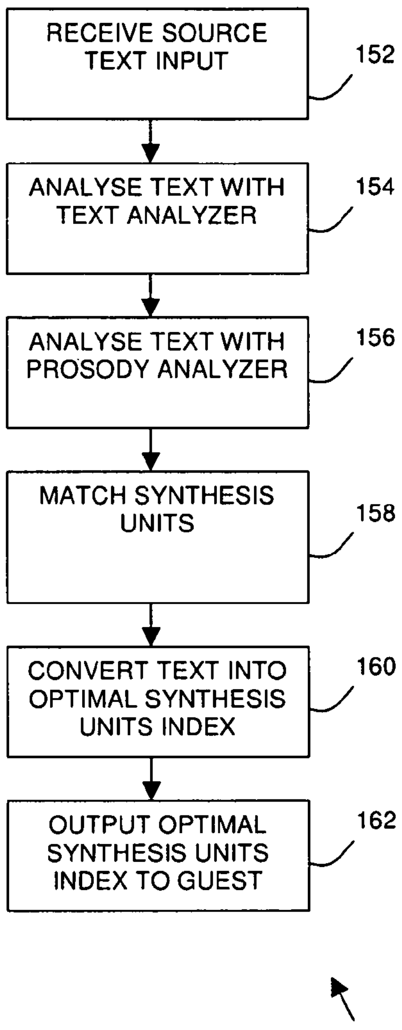
FIG. 5 is a flow chart of a method on the host device in accordance with an embodiment of the invention.

FIG. 5 is a flow chart of a method 150 on the host device 12 in accordance with an embodiment of the invention. The host 12 receives 152 source text input 90 from any source including the guest device 40. The text analyzer 72 conducts text analysis 154 and the prosody analyzer 74 conducts prosody analysis 156. The synthesis units are matched 158 in the host component 82 of the speech synthesizer 80 with access to the database 14. The text input 90 is converted 160 into an optimal synthesis units index 112. In an embodiment the optimal synthesis units index 112 is sent 162 to the guest device 40.

Figure 6:
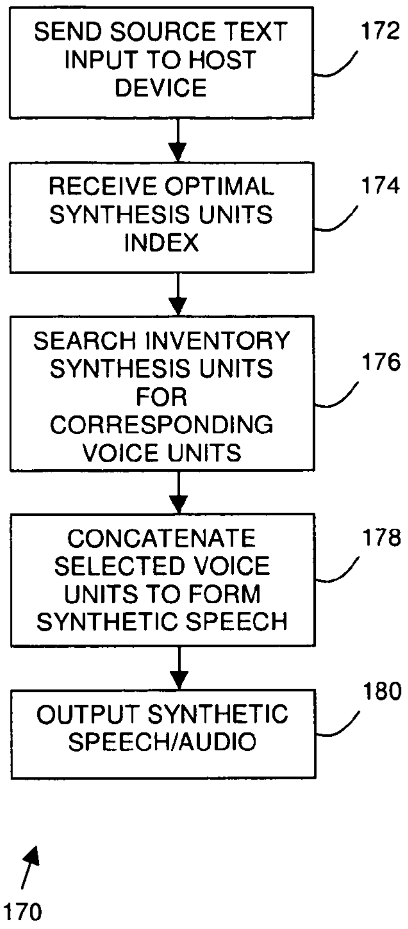
FIG. 6 is a flow chart of a method on the guest device in accordance with an embodiment of the invention.

FIG. 6 is a flow chart of a method on the guest device 40 in accordance with an embodiment of the invention. The guest device 40 sends 172 the text input 90 to the host device 12 for processing of the text input 90. Once the synthesis units index or audio index is sent processed by the host device 12 and received 174 by the guest component 84 of the speech synthesizer 80, the guest component 84 of the speech synthesizer 80 searches 176 the inventory synthesis units 106 for corresponding audio units or voice units. Once selected, the unit-concatentative module 122 concatenates 176 the selected voice units to form the audio file which may form synthetic speech. The audio file is output 180 to the output device 54, 56. The synthetic speech may be either the single voice form or the competing voice form (as described with reference to FIGS. 7 and 8).

With this configuration in this embodiment, the text analyzer 72, prosody analyzer 74 and the unit selection module 104 that are power, processing and memory intensive are resident or located on the host device 12, while the unit-concatenative module 122 which is relatively less power, processing and memory intensive is resident or located on the guest device 40. The inventory of synthesis units 126 on the guest device 40 may be stored in memory such as flash memory. The audio index may take different forms. For example, "hello" may be expressed in unit index form. In one embodiment the optimal synthesis units index 112 is a text string and relatively small in size when compared with the size of the corresponding audio file. The text string may be found by the host device 12 when the guest device 40 is connected with the host device 12 and the host 12 may search for text strings from different sources possibly at a request of the user. The text strings may be included within media files or attached to the media files. It will be appreciated that in other embodiments, the newly created audio index that describes a particular media file can be attached to the media file and then stored together in a media database, such as the media database. For example, audio index that describes the song title, album name, and artist name can be attached as "song-title index", "album-name index" and "artist-name index" onto a media file.

An advantage of the present invention relates to how entries to the host synthesis unit index 112 are not purged over time, and that the host synthesis unit index 112 is continually being bolstered by subsequent entries. Thus, when a text string is similar to another text string which has been processed earlier, there is no necessity for the text string to be processed to generate output speech 98. Thus, the present invention also generates consistent output speech 98 given that the host synthesis unit index 112 is repeated referenced.

While embodiments of the invention have been described and illustrated, it will be understood by those skilled in the technology concerned that many variations or modifications in details of design or construction may be made without departing from the present invention.

The invention claimed is:

1. A system for distributed text-to-speech synthesis comprising:
- a guest device configured for transmitting text input in the form of a text string;
- a host device configured to receive the text string and process the text string by converting the text string to an audio index representation of an audio file associated with the text string, the host device comprising:
  - a text analyzer configurable to process the text string to produce phonetic information and linguistic information;
  - a prosody analyzer configurable to generate prosodic information based on at least the phonetic information and linguistic information,
- wherein the converting at the host device being based on at least the phonetic information and prosodic information, and includes identifying audio units from a first audio unit synthesis inventory on the host device, wherein the guest device comprises:

a second audio unit synthesis inventory where audio units are selected from and selection of audio units from the second audio unit synthesis inventory being based on the audio index representation sent from the host device; and a unit-concatenative module for concatenating the selected audio units.

2. The system as recited in claim 1 wherein the host device and the guest device are in communication with each other, the host device adapted to receive a text input in a form of text string from either the guest device or any other source; the host device having a unit-selection module configured to create an audio index representation of an audio file from the text string on the host device and to convert the text string to an audio index representation of an audio file associated with the text string at a text-to-speech synthesizer, the unit-selection module being arranged to identify audio units from the first audio unit synthesis inventory, the identified audio units forming the audio file, the identified audio units being represented by the audio index representation.

3. The system of claim 1 wherein the guest device is a portable handheld device.

* * * * *